United States Patent
Reial et al.

(10) Patent No.: US 7,746,961 B2
(45) Date of Patent: Jun. 29, 2010

(54) EFFICIENT DETECTION OF PREDETERMINED SEQUENCES

(75) Inventors: Andres Reial, Lund (SE); Peter Malm, Lund (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 1041 days.

(21) Appl. No.: 11/279,287

(22) Filed: Apr. 11, 2006

(65) Prior Publication Data

US 2007/0237266 A1 Oct. 11, 2007

(51) Int. Cl.
*H04L 27/06* (2006.01)

(52) U.S. Cl. .................. 375/341; 714/794

(58) Field of Classification Search ............. 375/341, 375/262; 714/794
See application file for complete search history.

(56) References Cited

U.S. PATENT DOCUMENTS

| | | | |
|---|---|---|---|
| 5,305,349 A | 4/1994 | Dent | |
| 5,577,025 A | 11/1996 | Skinner et al. | |
| 6,061,823 A | 5/2000 | Nara | |
| 6,219,389 B1 | 4/2001 | Pappas et al. | |
| 6,272,660 B1 * | 8/2001 | Chen et al. | 714/794 |
| 6,363,104 B1 | 3/2002 | Bottomley | |
| 6,418,163 B2 * | 7/2002 | Tidemann et al. | 375/225 |
| 6,606,349 B1 | 8/2003 | Kudhrethaya et al. | |
| 6,700,938 B1 | 3/2004 | Feeney et al. | |
| 6,801,565 B1 | 10/2004 | Bottomley et al. | |
| 2001/0028677 A1 | 10/2001 | Wang et al. | |
| 2002/0021682 A1 * | 2/2002 | Ariyoshi et al. | 370/335 |
| 2002/0037749 A1 | 3/2002 | Wager | |
| 2002/0131532 A1 * | 9/2002 | Chi et al. | 375/341 |
| 2003/0007577 A1 * | 1/2003 | Shiu et al. | 375/341 |
| 2003/0147371 A1 * | 8/2003 | Choi et al. | 370/341 |
| 2003/0192003 A1 | 10/2003 | Das et al. | |
| 2004/0001428 A1 | 1/2004 | Datta et al. | |
| 2004/0062298 A1 | 4/2004 | McDonough et al. | |
| 2004/0146091 A1 | 7/2004 | Chang et al. | |
| 2004/0160936 A1 | 8/2004 | Liu et al. | |

(Continued)

FOREIGN PATENT DOCUMENTS

WO 02/30004 A2 4/2002

OTHER PUBLICATIONS

3GPP Technical Specification TS 25.213 V6.4.0 Technical Specification Group Radio Access Network; Spreading and modulation (FDD), Release 6, Sep. 2005.
ETSI Technical Specification TS 125 309 V6.4.0 Universal Mobile Telecommunications System (UMTS); FDD enhanced uplink; Overall description; Stage 2, Sep. 2005.
3GPP Technical Specification TS 25.309 V6.5.0 Technical Specification Group Radio Access Network; FDD Enhanced Uplink; Overall description; Stage 2, Release 6, Section 9, Dec. 2005.

(Continued)

*Primary Examiner*—Emmanuel Bayard
(74) *Attorney, Agent, or Firm*—Potomac Patent Group PLLC

(57) ABSTRACT

Hypothesis tests, such as maximum likelihood detections, are executed on symbol sequences received by, for example, a user equipment (UE) in a communication system. The hypothesis tester checks a received sequence against a group of predetermined sequences that possibly could have been sent to the UE. For received sequences that are matched or not matched by the hypothesis tester with high confidence, complete decoding, for example, with a Viterbi decoder, is not necessary. Instead, complete decoding is used as a "tie-breaker" for those sequences which the hypothesis tester cannot match or not match with desired confidence levels.

22 Claims, 8 Drawing Sheets

U.S. PATENT DOCUMENTS

| | | |
|---|---|---|
| 2005/0066260 A1 | 3/2005 | Natori |
| 2005/0078648 A1 | 4/2005 | Nilsson |
| 2005/0105647 A1 | 5/2005 | Wilhelmsson et al. |
| 2005/0117519 A1 | 6/2005 | Kwak et al. |
| 2005/0138531 A1 | 6/2005 | Kim |
| 2005/0180492 A1* | 8/2005 | Dent .......................... 375/144 |
| 2005/0220116 A1 | 10/2005 | Ahn et al. |
| 2006/0107165 A1* | 5/2006 | Murata et al. ............... 714/748 |
| 2006/0166616 A1* | 7/2006 | Kwak et al. ................ 455/3.01 |
| 2007/0160141 A1* | 7/2007 | Nagai et al. ............ 375/240.12 |
| 2008/0069212 A1* | 3/2008 | Abe et al. .............. 375/240.13 |

OTHER PUBLICATIONS

3GPP Technical Specification TS 25.321 V6.7.0 Technical Specification Group Radio Access Network; Medium Access Control (MAC) protocol specification, Release 6, Section 11.8, Dec. 2005.

3GPP Technical Specification TS 25.212 V6.7.0 Technical Specification Group Radio Access Network; Multiplexing and channel coding (FDD), Release 6, Section 4.10, Dec. 2005.

European Standard Search Report, completed Feb. 9, 2007.

* cited by examiner

EFFICIENT DETECTION OF PREDETERMINED SEQUENCES

BACKGROUND

This invention relates to electronic digital communication systems and more particularly to radiotelephone systems.

Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS and WCDMA standards. This application focuses on WCDMA systems for simplicity, but it will be understood that the principles described in this application can be implemented in other digital communication systems.

WCDMA is based on direct-sequence spread-spectrum techniques, with pseudo-noise scrambling codes and orthogonal channelization codes separating base stations and physical channels (terminals or users), respectively, in the downlink (base-to-terminal) direction. Since all users share the same radio resource in CDMA systems, it is important that each physical channel does not use more power than necessary. This is achieved by a transmit power control (TPC) mechanism, in which, among other things, base stations send TPC commands to users in the downlink (DL) direction and the users implement the commands in the uplink (UL) direction and vice versa. The TPC commands cause the users to increase or decrease their transmitted power levels by increments, thereby maintaining target signal-to-interference ratios (SIRs) for the dedicated physical channels (DPCHs) between the base stations and the users. WCDMA terminology is used here, but it will be appreciated that other systems have corresponding terminology. Scrambling and channelization codes and transmit power control are well known in the art.

FIG. 1 depicts a mobile radio cellular telecommunication system 10, which may be, for example, a WCDMA communication system. Radio network controllers (RNCs) 12, 14 control various radio network functions, including for example radio access bearer setup, diversity handover, etc. More generally, each RNC directs calls to and from user equipments (UEs), such as mobile stations (MSs), via the appropriate base station(s) (BSs), which communicate with each UE through DL, or forward, and UL (i.e., mobile-to-base, or reverse) channels. RNC 12 is shown coupled to BSs 16, 18, 20, and RNC 14 is shown coupled to BSs 22, 24, 26. Each BS, which is called a Node B in 3GPP parlance, serves a geographical area that can be divided into one or more cell(s). BS 26 is shown as having five antenna sectors S1-S5, which can be said to make up the cell of the BS 26. The BSs are coupled to their corresponding RNCs by dedicated telephone lines, optical fiber links, microwave links, etc. Both RNCs 12, 14 are connected with external networks such as the public switched telephone network (PSTN), the Internet, etc. through one or more core network nodes, such as a mobile switching center (not shown) and/or a packet radio service node (not shown).

A BS in a WCDMA system may use a primary scrambling code and one or more so-called secondary or alternative scrambling codes, each of which can be used with several channelization codes. Orthogonal variable spreading factor (OVSF) channelization codes are used in order to maintain link orthogonality while accommodating different user data rates. The OVSF scheme is a kind of code tree, in which each level in the tree is a set of codes that are mutually orthogonal and have the same SF. Since the chip rate in a direct-sequence CDMA system is typically constant, a higher SF, corresponding to a different level in the code tree, generally corresponds to a lower information bit-rate.

High-speed downlink packet access (HSDPA) is an evolution of WCDMA communication systems that provides higher bit rates, e.g., up to more than 10 megabits per second (Mb/s), by using higher order modulation, e.g., 16-ary quadrature amplitude modulation (16-QAM), multiple spreading codes, e.g., up to fifteen codes with SFs of 16, and DL-channel feedback information. The DL-channel feedback information is information sent by a UE to a BS through the UL channel regarding the DL channel's quality. The BS providing HSDPA service is usually called the "serving" BS or cell, and the HS-channels in the DL are transmitted only from the HSDPA serving cell. The serving BS uses the DL-channel feedback information to optimize the DL modulation and coding for throughput.

Another evolution of WCDMA is Enhanced Uplink (EUL), or High-Speed Uplink Packet Access (HSUPA), that enables high-rate packet data to be sent in the reverse direction. Efficiency of the UL transmission and maximization of the available network capacity are achieved by carefully scheduling the UL transmissions of the usually many UEs in a cell. The serving BS informs the individual UEs of when they are allowed to transmit, and at which power level, so that the total power in the cell and the noise remain within the acceptable limits. The transmission power levels for the UEs and the permissions to transmit are transmitted from the serving BS by absolute and relative grant messages carried by enhanced absolute and relative grant channels (E-AGCH and E-RGCH). These messages and channels are described, for example, in 3GPP Technical Specification (TS) 25.309 V6.5.0, FDD Enhanced Uplink Overall Description Stage 2 (Release 6), December 2005, Section 9, and 3GPP TS 25.321 V6.7.0, Medium Access Control (MAC) Protocol Specification (Release 6), December 2005, Section 11.8.

UL absolute grant information is packaged in serving grant (SG) messages carried by the E-AGCH. According to the WCDMA standards, an SG message includes six bits sent over one transmission time interval (TTI). It will be appreciated, however, that the methods and apparatus described in this application can be used with other message formats in other types of communication system.

In a WCDMA communication system, the E-AGCH is assigned one OVSF code having SF=256, whereby 10 QPSK symbols per slot are transmitted. All SG messages are transmitted on the same channel, and individual SG messages are tagged with the signature of the targeted UE. An SG message is coded into 30 QPSK symbols, which are transmitted over 3 time slots during a TTI having a duration of 2 milliseconds (ms). If the duration of the TTI is 10 ms, the 3-slot SG message is repeated five times during the TTI.

The E-AGCH signal is generated according to 3GPP TS 25.212 V6.7.0, Multiplexing and Channel Coding (FDD) (Release 6), December 2005, Section 4.10. FIG. 2 depicts the coding process. As indicated by step 202, a UE-specific cyclic redundancy check (CRC) signature of 16 bits and 8 tail bits are appended to the 6 AG message bits $x_{ag1}, x_{ag2}, \ldots, x_{ag6}$. In step 204, the 30-bit sequence $y_1, y_2, \ldots, y_{30}$ is then coded using a rate-⅓, constraint-length-9 convolutional code. Rate matching is applied in step 206 to the resulting 90 bits $z_1, z_2, \ldots, z_{90}$ to produce a 60-bit transmit sequence $r_1, r_2, \ldots, r_{60}$, which is mapped to the physical channel, i.e., modulated onto a sequence $x_k$ of 30 QPSK symbols spanning the 3 time slots that are transmitted as the E-AGCH in a WCDMA system.

A UE can monitor the E-AGCH for grant messages simply by reversing the coding steps depicted in FIG. 2. The UE then typically includes, among other things, a Viterbi decoder that produces a local version of the 30-bit sequence $y_1, y_2, \ldots, y_{30}$ for each TTI and a device for checking CRC bits to determine if each sequence is properly decoded and intended for the particular UE. In case of a match, the UE applies a received message as an SG command.

The UE must monitor the E-AGCH constantly for grant messages while an enhanced dedicated channel (E-DCH) is configured. As a result, the monitoring equipment in the UE must be active during every TTI. Most of this activity conveys no useful information to the UE because the frequency of sending SG messages to any given UE is usually low, and thus the energy consumed and resources utilized during most of the decoding activity are effectively wasted.

SUMMARY

This application describes methods and apparatus that, among other things, reduce a UE's computational load and energy consumption associated with checking for SG messages.

In accordance with aspects of this invention, there is provided a method in a UE of detecting predetermined sequences in sequences received by the UE. The method includes the steps of conducting a hypothesis test on a received sequence; determining based on a result of the hypothesis test whether to decode the received sequence; if it is determined to decode the received sequence, decoding the received sequence; and determining whether the received sequence is a predetermined sequence based on at least one of the result of the hypothesis test and a decoded received sequence.

In accordance with other aspects of this invention, there is provided an apparatus in a user equipment (UE) for detecting predetermined sequences in sequences received by the UE. The apparatus includes a hypothesis tester adapted to conduct a hypothesis test on a received sequence and to determine, based on a result of the hypothesis test, whether the received sequence is a predetermined sequence; a decoder, responsive to the hypothesis tester, adapted to decode the received sequence; and a tester, responsive to the hypothesis tester, adapted to determine whether the received sequence is a predetermined sequence. Whether the received sequence is decoded is based on the result of the hypothesis test.

BRIEF DESCRIPTION OF THE DRAWINGS

The various aspects, features, and advantages of this invention will be understood by reading this description in conjunction with the drawings, in which.

DETAILED DESCRIPTION

The inventors have devised a reduced-complexity E-AGCH detection scheme that can be thought of as a "coarse" filter, such as a maximum likelihood (ML) detector, in series with a "fine" filter, such as a Viterbi decoder. The coarse filter identifies the relatively infrequent times when using, or invoking, the fine filter is necessary, i.e., when an SG command is likely, but not certain, to have been received. Thus, the energy used by a UE for operating its Viterbi decoder or other fine filter can be reduced.

An ML detector can also be considered a kind of hypothesis tester, and such an hypothesis test is executed on each received E-AGCH sequence, i.e., during each TTI while the E-DCH is configured. It is currently believed that, besides ML detection, other hypothesis tests where a measure of confidence can be attached to the winning hypothesis can also be suitable. The hypothesis tester checks each received sequence against all possible SG commands that could be sent to the given UE. For sequences that are identified or discarded by the hypothesis tester with high confidence, complete decoding, e.g., with a Viterbi decoder, is not necessary. Instead, complete decoding is used as a "tie-breaker" for those sequences which the hypothesis tester cannot match with a desired confidence level.

For example, if a high-confidence match to an SG command is found for a particular received sequence, that SG command is preferably applied without further decoding of the sequence. If with high confidence no possible matching SG commands are found, no SG command is applied and still no further decoding is carried out. If a possible match is found, but its identification has an insufficient confidence level based on the ML decision quality, the Viterbi decoder is activated and parity-check or other integrity-verifying information of the decoded message sequence is checked. If a match is confirmed, the corresponding SG command is applied.

Figure 1:
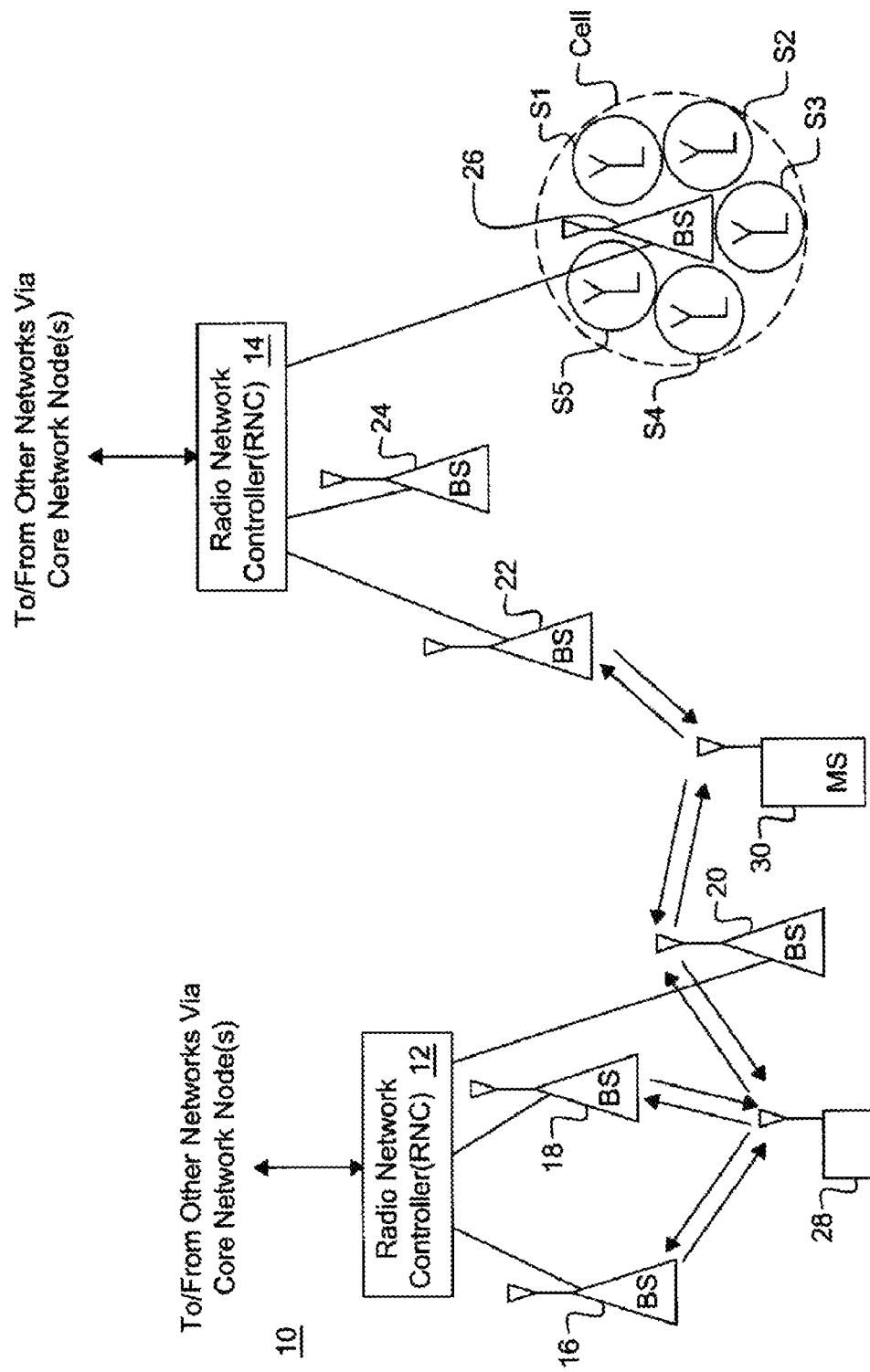
FIG. 1 depicts a mobile radio cellular telecommunication system.
Figure 2:
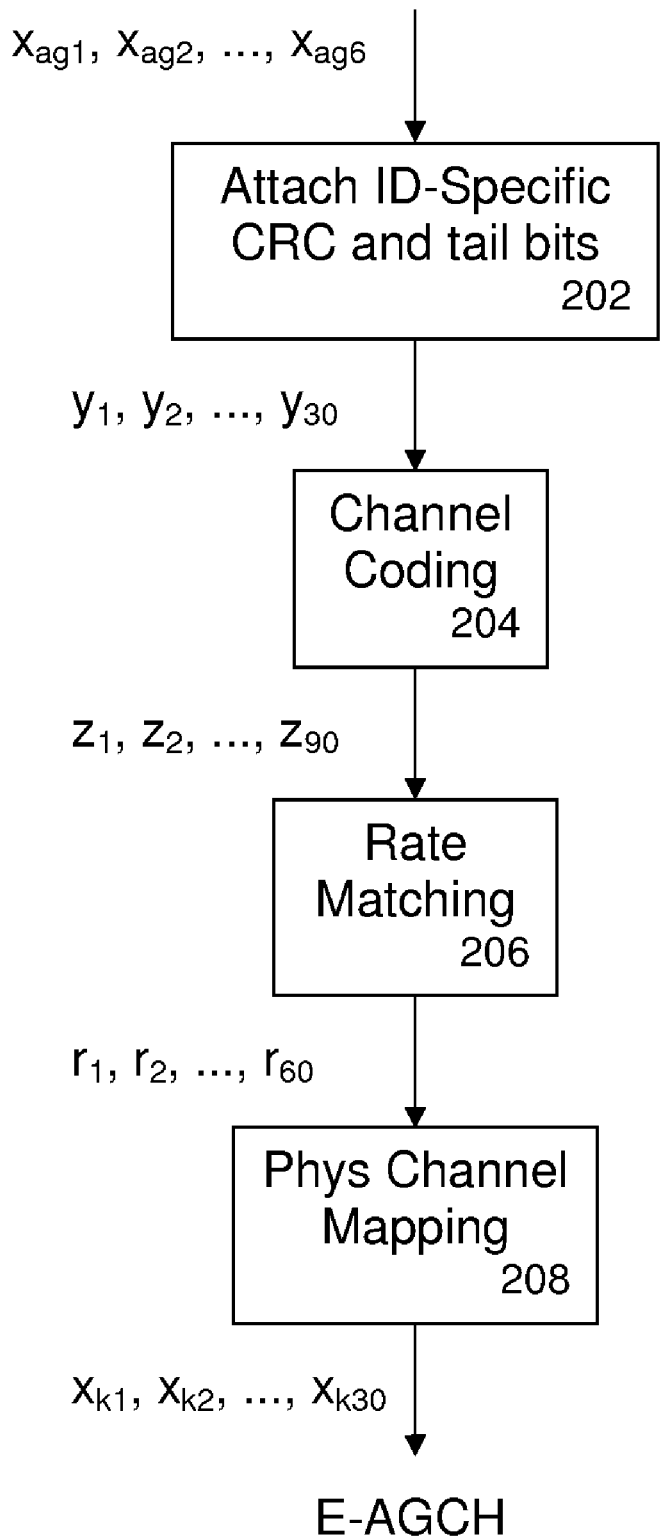
FIG. 2 depicts coding for an extended absolute grant channel.
Figure 3A:
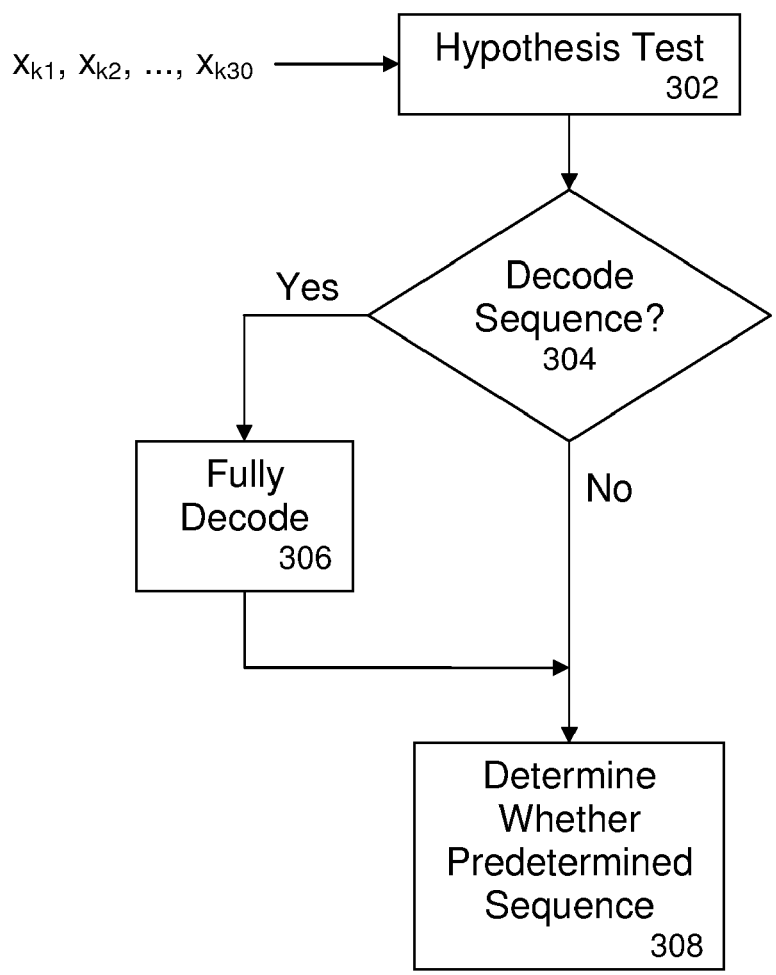
FIGS. 3A, 3B, 3C, 3D, 3E depict methods of determining whether a particular signal has been received.

FIG. 3A is a flow chart of a suitable method of detecting predetermined sequences. Received sequences $x_k$ are presented for hypothesis testing (step 302), e.g., by maximum likelihood detection. As described above, the sequences $x_k$ can include sequences of QPSK symbols. It will also be understood that other sequences, such as the rate-matched sequence $r_1, r_2, \ldots, r_{60}$ recovered by the UE or another of the sequences depicted in FIG. 2, may be presented instead. Based on a result of the hypothesis test, it is determined whether to decode the received sequence (step 304), and if so, the received sequence is decoded (step 306). Whether the received sequence is a predetermined sequence is determined based on at least one of the result of the hypothesis test and a decoded received sequence (step 308). If the received sequence is a predetermined sequence, it can be acted upon or implemented. If not, the received sequence can be ignored or otherwise handled.

The determination in step 304 can be carried out in many different ways that are fully equivalent to each other, and four such ways are illustrated by FIGS. 3B, 3C, 3D, and 3E. In these methods, many of the steps are the same but their placements in the methods are different.

Figure 3B:
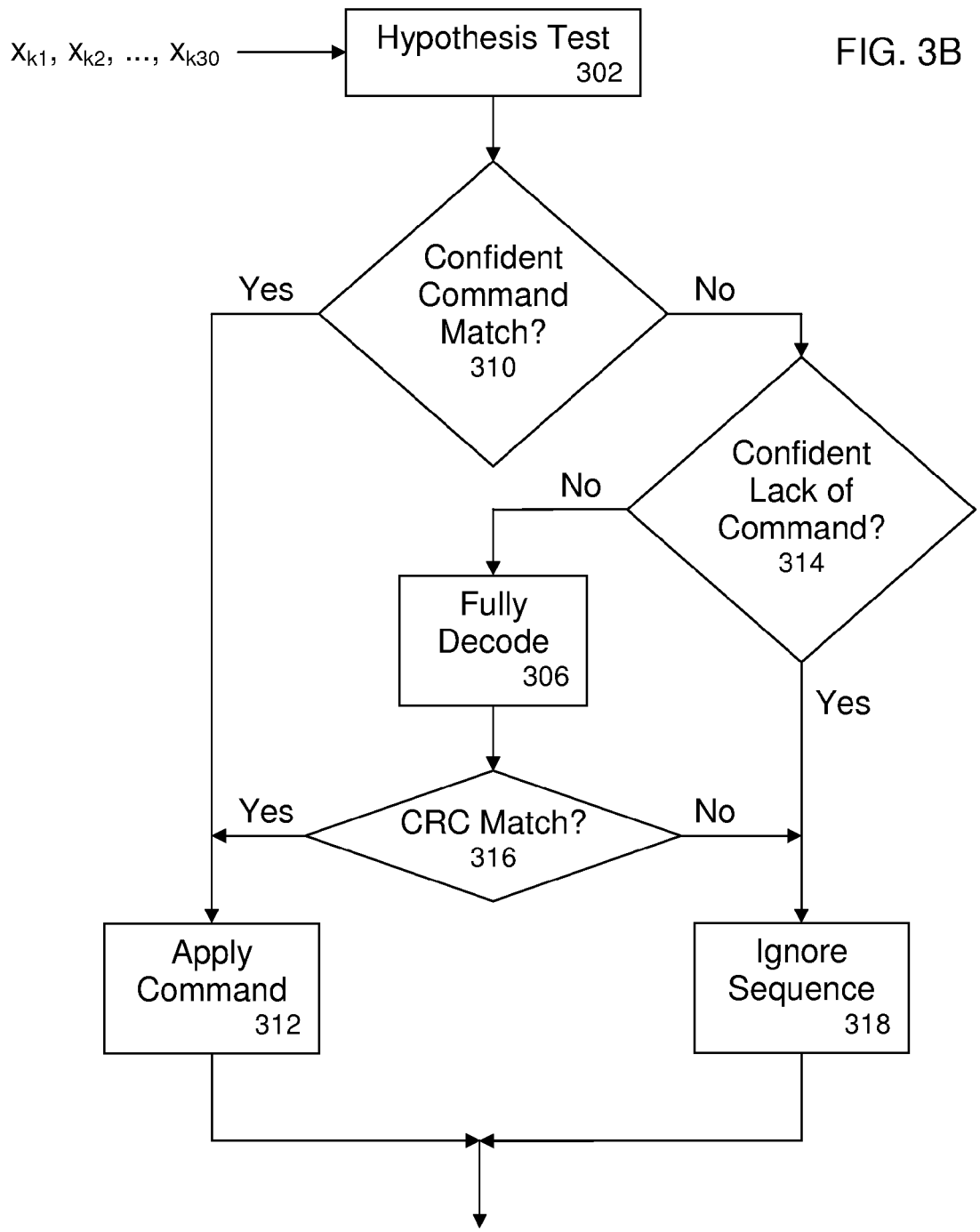

In FIG. 3B, received sequences $x_k$ are presented for hypothesis testing (step 302), and if the result of the hypothesis test indicates that the received sequence matches a predetermined sequence, e.g., an SG command, with a first sufficient confidence level (Yes in step 310), the received sequence is applied as the matching command (step 312).

If the result of the hypothesis test does not indicate a match having the first sufficient confidence level (No in step 310), it is determined whether a no-match having a second sufficient confidence level has been found (step 314). If not (No in step 314), the received sequence is fully decoded (step 306), e.g., using a Viterbi decoder, and decoded error detection information, e.g., parity check information such as a CRC, is checked (step 316). If the CRC indicates that the received sequence has been correctly decoded as a command and is directed to this UE (Yes in step 316), the received command is applied (step 312).

If the CRC indicates either that the received sequence has not been correctly decoded as a command or is not directed to this UE (No in step 316) or it has been determined with the second confidence level that the received sequence does not match the possible commands or other predetermined sequences (Yes in step 314), the flow proceeds without applying the received sequence as a command (step 318).

As described further below, the first and second confidence levels, which can be represented by thresholds $\gamma$ and $\tau$, can be individually adjustable. Thus, the required "decision quality" (confidence) in either direction may be adjusted independently, for example as required by the implementation of the methods and apparatus, and possibly as a function of reception conditions (e.g., SIR). It is currently expected that the confidence levels will typically be different.

Figure 3C:
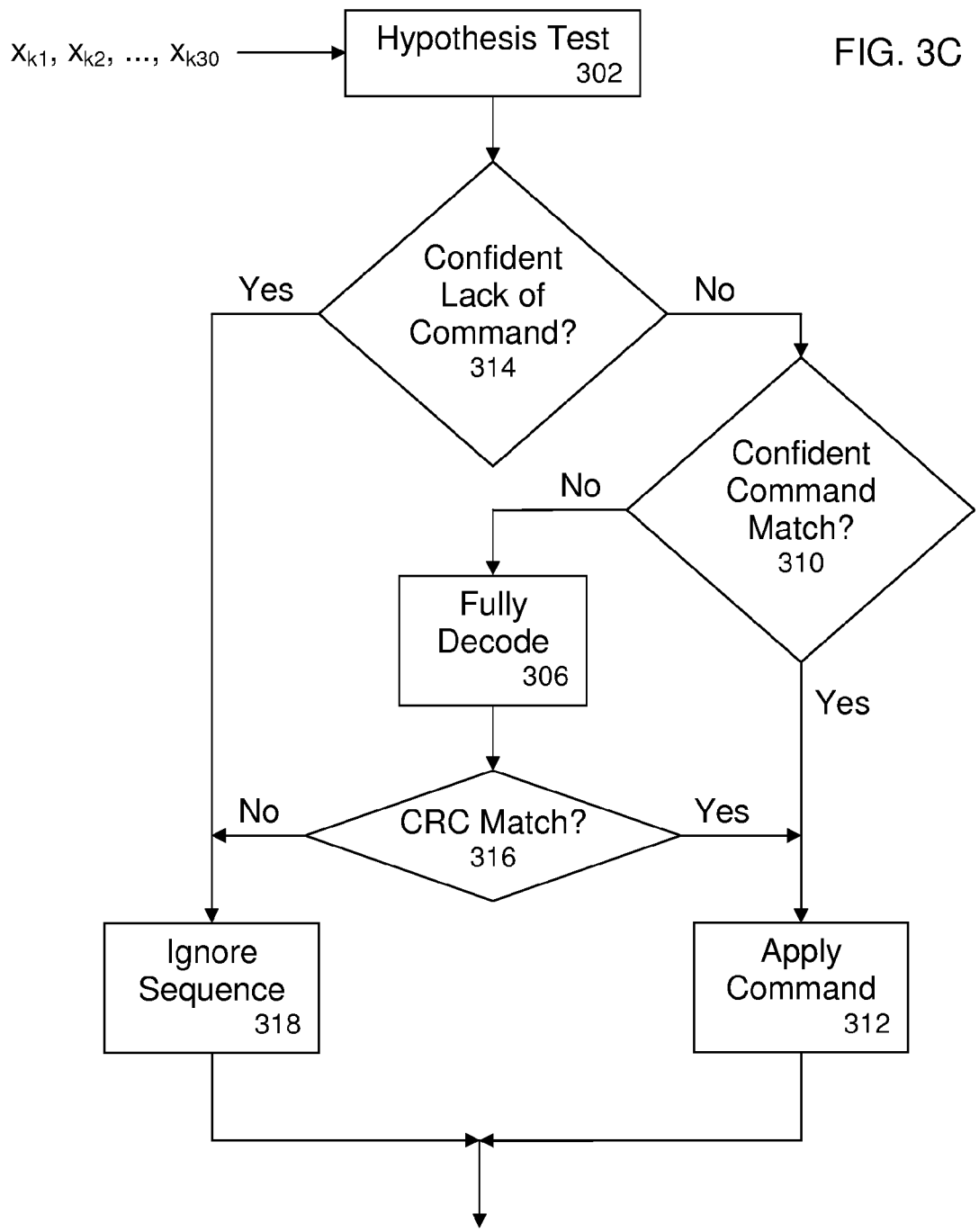

It will also be understood that that the order of the decisions 310, 314 is immaterial and that many different orders (even more-complex-than-necessary decision trees) can be formulated. FIG. 3C is a flow chart of one example of a different order, in which the steps are the same as those described above with respect to FIG. 3B but their placement in the chart (i.e., the order in which they are performed) is different.

Figure 3D:
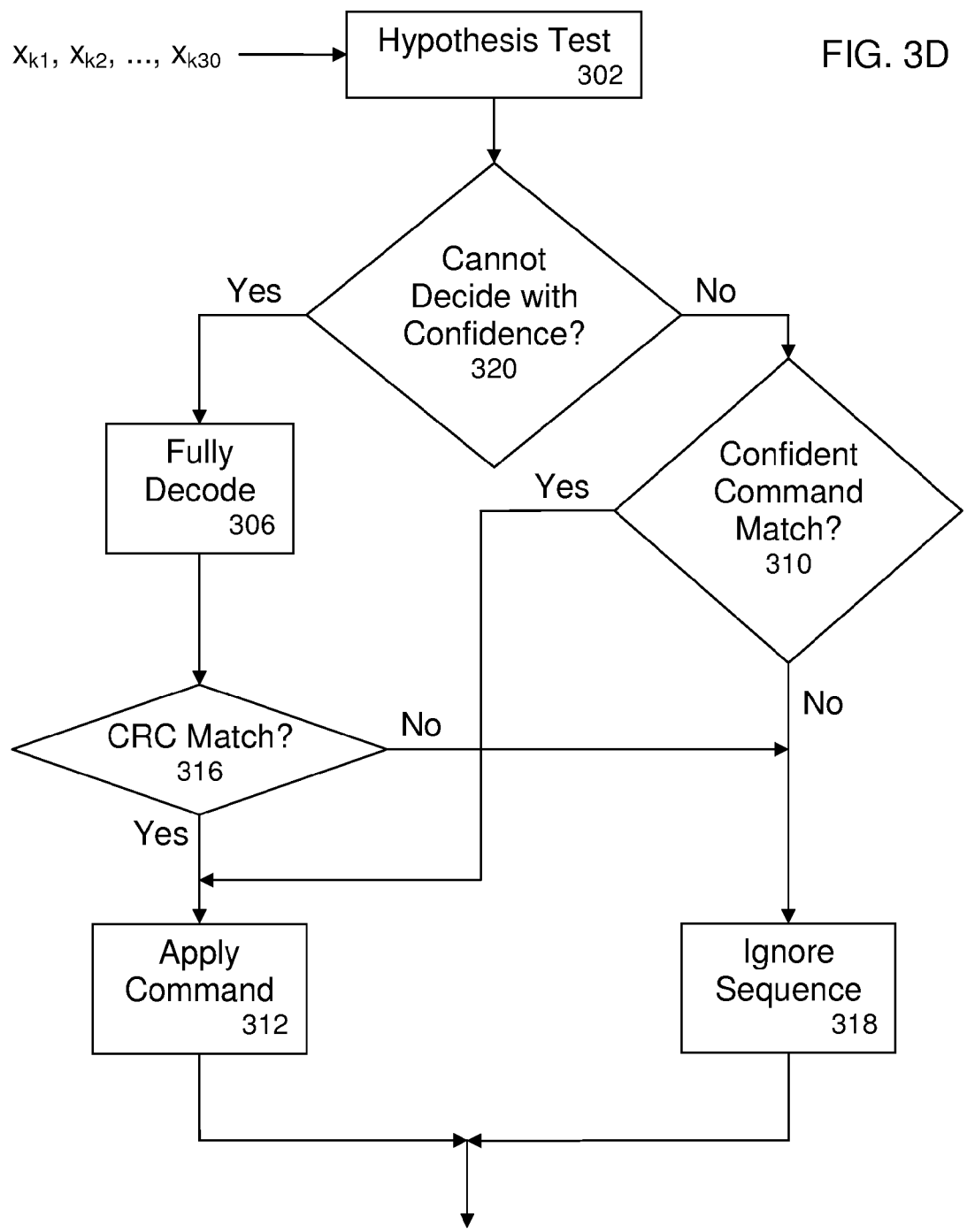
Figure 3E:
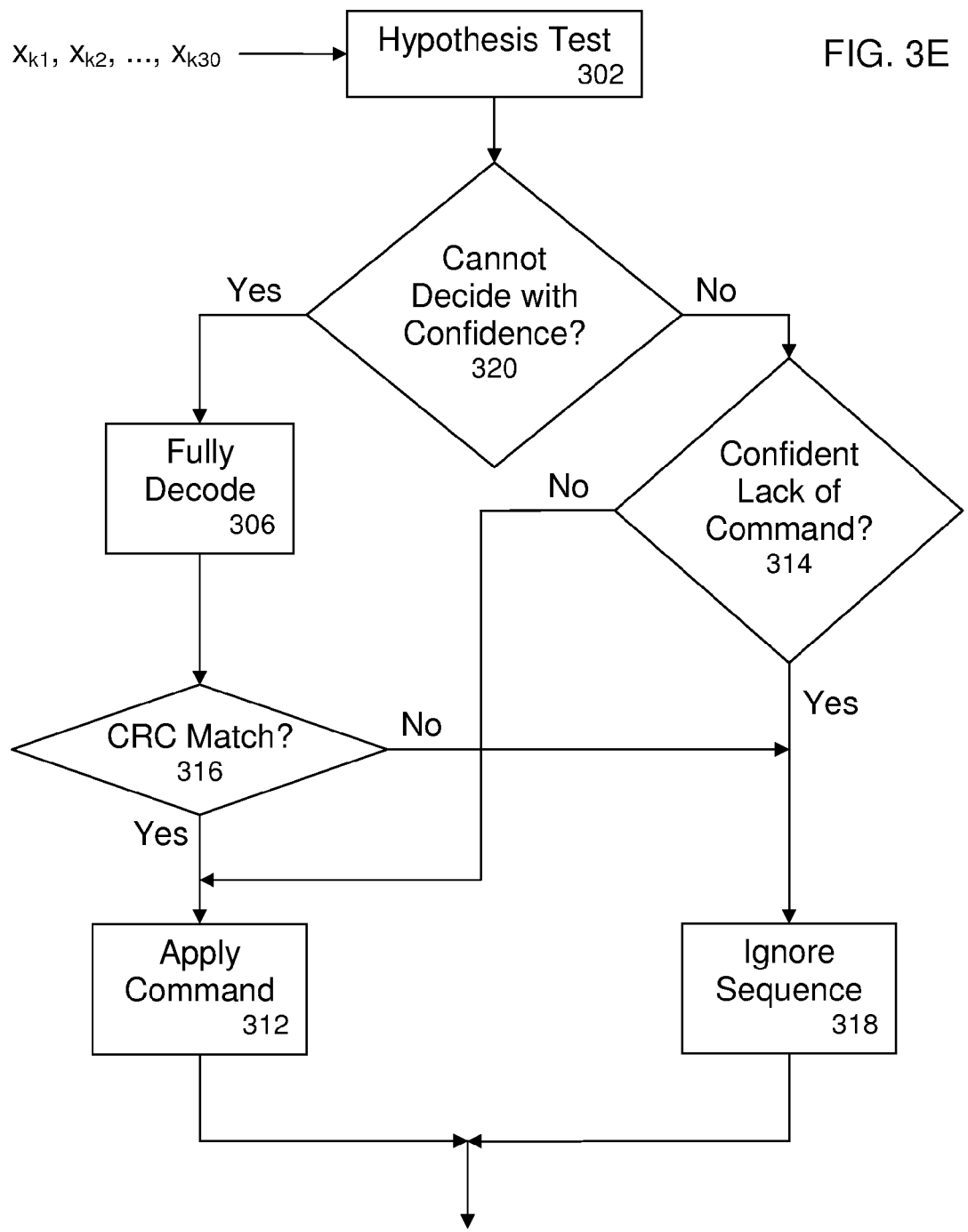

Moreover, different decisions can be made that result in methods that are fully equivalent to those illustrated by FIGS. 3B and 3C. For example, FIGS. 3D and 3E are flow charts of two such equivalent methods of detecting predetermined sequences, in which all but one of the steps are the same as those described above with respect to FIG. 3B but their placements in the charts are different. A new decision in FIGS. 3D and 3E is step 320, which represents that the result of the hypothesis test indicates neither a match having the first sufficient confidence level nor a no-match having the second sufficient confidence level.

These activities are carried out for each TTI while the E-DCH is configured, but even so, it will be seen that the Viterbi decoder will be unused usually for a majority of the time, while maintaining the detection and false alarm performance needed by the UE. It will also be seen that the hypothesis testing 302 and the full decoding 310 are in series in the process flow.

As described above, the E-AGCH transmission duration is three slots for a 2-ms-long TTI and fifteen slots (a 3-slot sequence repeated five times) for a 10-ms-long TTI, and the E-AGCH is transmitted in successive TTIs by only the serving cell.

Let a length-30 sequence of QPSK symbols in a TTI k be denoted by $x_k$. Further let the $2^6$ possible QPSK-modulated sequences for a given UE be denoted by $c^{(j)} = c^{(j)}_1, c^{(j)}_2, \ldots, c^{(j)}_{30}$, where $j=1, 2, \ldots, 64$. Then, the correlation value for a hypothesis j for the TTI k is given by:

$$y_k^{(j)} = Re[x_k c^{(j)H}]$$

where Re denotes the real part and H denotes the Hermitian transpose. The ML solution over the subset of sequences for the given UE can be identified as $j^* = \arg\max y^{(j)}_k$, where the max function is evaluated over j.

Let an estimate of the noise floor for the TTI be denoted by $\sigma^2_k$. The noise floor estimate may be determined in a number of ways, e.g., according to:

$$\sigma^2_k = \frac{1}{62} \sum_{j=1\ldots64, j \neq j^*} y_k^{(j)} y_k^{(j)*}$$

Some other suitable ways to determine a noise floor estimate are described in U.S. Patent Application Publication No. 2005/0078648 by Nilsson for "Adaptive Threshold for HS-SCCH Part 1 Decoding". The decision variable z for ML hypothesis testing is then given by:

$$z = \frac{y_k^{(j^*)}}{\sqrt{\sigma^2_k}}$$

Next, we describe how the ML decision variable can be used to determine whether a message has been transmitted to a given UE.

As described above, a message j* is interpreted and applied as a SG message and the CRC is not checked if the ML decision has sufficiently high reliability. This is depicted in FIG. 3B by the Yes path from step 310, and is expressed by $z \geq \gamma$. Those of ordinary skill in this art will understand the analysis is reflected in the other drawings.

If the ML decision variable indicates an E-AGCH command was likely sent to the UE but a desired false alarm probability is not guaranteed, the traditional decoding chain may be activated. This is depicted in FIG. 3B by the No path from step 310, and is expressed by $\tau \leq z < \gamma$. Then, the received QPSK symbol sequence $x_k$ is demodulated into a 60-bit sequence, which is then rate-dematched to a 90-bit sequence that is fully decoded, e.g., by a Viterbi decoder. The CRC portion or portions of the decoded codeword, e.g., bits 7-22, are de-masked using a UE-specific mask and the resulting CRC signature is verified against the E-AGCH commands. If they match, the message j* is interpreted as an SG command and applied. This is depicted in FIG. 3B by the Yes path from step 316. If the CRC does not match, the SG status is not updated. This is depicted in FIG. 3B by the No path from step 316.

If $z < \tau$, full decoding is not carried out and the SG status is not updated. This is depicted in FIG. 3B by the Yes path from step 314.

Figure 4:
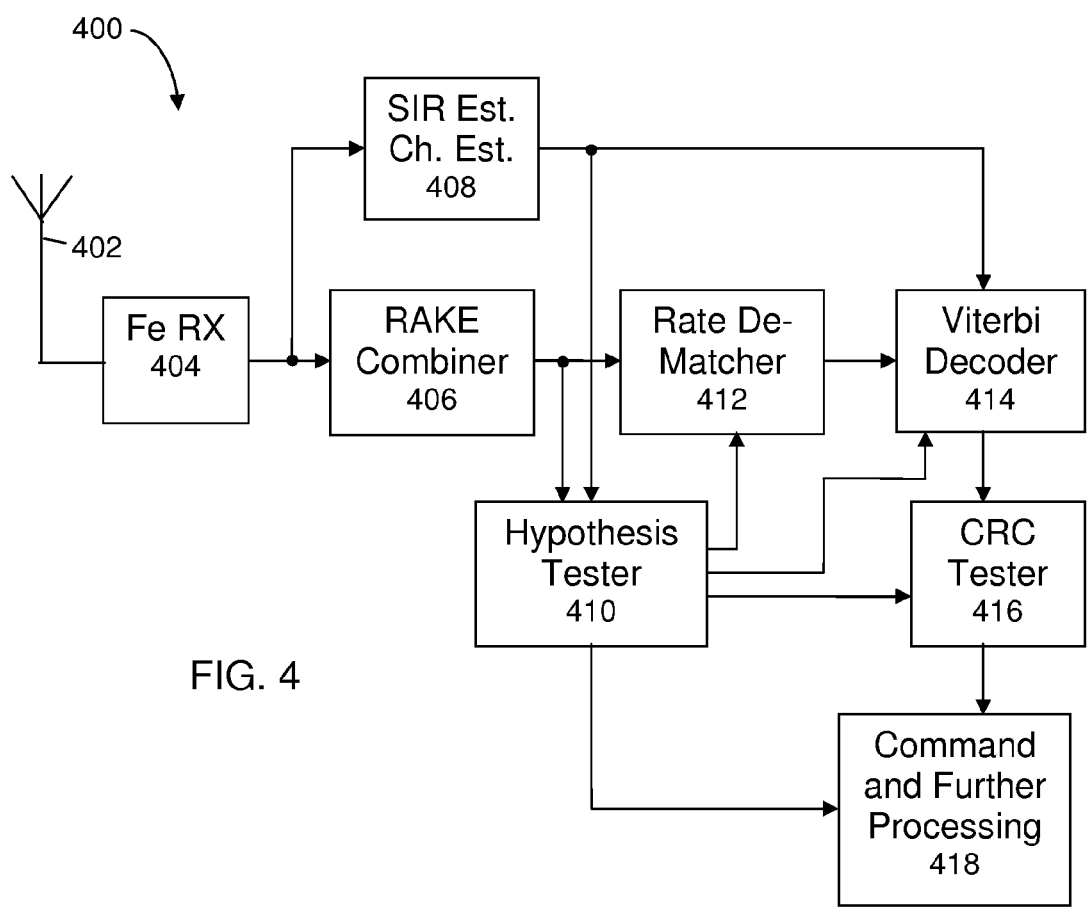
FIG. 4 is a block diagram of a portion of a user equipment.

FIG. 4 is a block diagram of a portion of a UE 400 that is suitable for implementing the two-step or hybrid message detection methods depicted in FIG. 3. The UE 400, such as a mobile terminal in a WCDMA communication system, receives and transmits radio signals through an antenna 402 and for example down-converts and samples the received signals in a front-end receiver (Fe RX) 404. The output samples are fed from Fe RX 404 to a RAKE combiner 406 that de-spreads and combines received echoes of data and control symbols. Output samples from the Fe RX 404 are also typically fed to an estimator 408, which estimates the SIR and impulse response of the DL radio channel.

RAKE combining and channel estimation are well known in the art, and for example are described in U.S. Pat. No. 5,305,349 to Dent for "Quantized Coherent Rake Receiver"; U.S. Pat. No. 6,363,104 to G. Bottomley for "Method and Apparatus for Interference Cancellation in a Rake Receiver"; and U.S. Pat. No. 6,801,565 to G. Bottomley et al. for "Multi-Stage Rake Combining Methods and Apparatus"; and U.S. Patent Application Publication No. 2001/0028677 by Wang et al. for "Apparatus and Methods for Finger Delay Selection in Rake Receivers". Channel estimation is described in, for example, U.S. Patent Application Publication No. 2005/0105647 by Wilhelmsson et al. for "Channel Estimation by Adaptive Interpolation".

Recovered sequences of received symbols pass from the RAKE combiner 406 to a hypothesis tester 410, which may be a suitably programmed electronic processor or logic configured to implement hypothesis testing, e.g., ML detection, on the sequences as described above. The sequences also pass to a rate de-matcher 412, which passes rate de-matched sequences to a channel decoder 414, such as a Viterbi decoder. Decoded output sequences generated by the decoder 414 pass to a CRC tester 416, which determines whether the sequences include the UE-specific CRC. If so, the sequences are passed to command and further processing 418 for implementation of the received commands. The hypothesis tester 410 also passes sequences determined with high confidence to include commands to the command processing 418, and sends control signals to the devices 412, 414, 416 that activate or deactivate those devices according to the results of the hypothesis tests.

An appropriate value of the threshold $\tau$ can be derived approximately as follows. Let the number of QPSK symbols in a TTI be denoted by M and let the spreading factor of the channel be denoted by SF. As described above, M may be 30 and SF is 256 for the E-AGCH. Also let the signal power of a chip of the E-AGCH be denoted by $E_c$ and the total power of the UE's own cell be denoted by $I_{or}$. The decision variable z can be normalized such that it has a unit variance and an expected value given by:

$$E[z] = \sqrt{N \cdot SF} \sqrt{\frac{\frac{E_c}{I_{or}}}{1 - \frac{E_c}{I_{or}} + \frac{I_{oc}}{I_{or}}}}$$

if a message was sent to the UE
$E[z]=0$, if a message was not sent to the UE.

The total energy received from the other base stations and interferers and generated in the receiver, i.e. the received energy not emanating from the serving cell, is denoted by $I_{oc}$. The quantity $I_{oc}/I_{or}$ will be recognized as a geometry factor.

The missed detection probability $P_{MD}$ and the false alarm probability $P_{FA}$ are then given by:

$P_{MD} = Q(E[z] - \tau)$ and $P_{FA} = Q(\tau)$, where the function Q is the tail integral of the Gaussian probability density function p(x), which can be expressed as:

$$Q(x) = \int_x^\infty p(x)dx.$$

The hypothesis testing or "coarse" filtering of the received signal, which may be implemented by ML detection as described above, triggers full decoding of the received signal, for example by a Viterbi decoder. It is usually desirable to have a probability of a false alarm that is as low as possible without also having a probability of a missed detection that is higher than desired. Because the probability of false alarms will be reduced to the desired level by the CRC check, it is important to ensure that the hypothesis testing does not degrade the missed-detection performance, viz., increase the probability of missing a transmitted command. Therefore, the threshold $\tau$ may be set so as to obtain at least the desired missed-alarm probability.

The threshold $\tau$ may be set by further taking into account the signal-to-noise ratio (SNR) of the decision variable z. For high SNR, the false-alarm probability can be lowered further by increasing the threshold $\tau$. In that way, an even larger percentage of unnecessary full decodings can be avoided.

For the E-AGCH, the high-confidence threshold value y may be selected as $\gamma=4.5$, which will ensure meeting the false-alarm performance specified by 3GPP. The threshold $\gamma$ may be tuned empirically to achieve a desired false-alarm probability.

As noted above, the threshold values $\tau$ and $\gamma$ may be set assuming the minimal received signal-to-interference (SIR) level required for successful decoding and kept constant for all channel conditions, as absolute grant commands for a given UE may appear at any time. As an alternative, one or both of the thresholds may be adjusted adaptively, e.g., in response to changing received SIR or if a pattern in the AG command transmission is established. For example, when the SIR is higher than the minimum required for successful decoding, the value of the threshold $\tau$ may be increased in order to reduce the probability of requiring a full decoding. Also, assuming for example that in a normally functioning network a given UE is not sent several SG commands in quick succession, the value of the threshold $\tau$ may be increased for a time after successfully detecting a SG command. It is currently believed that the threshold $\gamma$ may be adaptively adjusted, for example, approximately proportionally to the square root of the SIR value after combining.

Checking the CRC even in cases where the threshold $\gamma$ is exceeded can reduce the false-alarm probability to the low value consistent with the CRC, but as described above, the CRC check step is advantageously omitted if the decision variable indicates high reliability.

It will be recognized that the methods and apparatus described in this application can have many advantages. For example, it is currently estimated that a Viterbi decoder in a UE can be off-loaded from E-AGCH decoding for 90%-95% of the time, and thus constraints on the time-critical scheduling of the decoder are relaxed. The power consumption of the UE may also be reduced, and the missed-detection and false-alarm performances may be flexibly tuned by appropriately setting just two threshold parameters. In addition, the complexity of implementing ML detection in a UE is considerably less than the complexity of full Viterbi decoding.

This description is given for a context of E-AGCH decoding, but it will be understood that the two-step, or hybrid, detection process described above may also be used in other situations where the relevant message set consists of a limited number of hypotheses. For example, the process described above can be used for transport format combination indicator (TFCI) decoding in WCDMA communication systems, and other situations will be apparent to the artisan. It is particularly applicable to reception scenarios where the decoding performance (missed-detection and false-alarm probabilities) is constrained and messages contain a CRC or other validation mechanism.

U.S. Patent Application Publication No. 2005/0078648 cited above describes that HS-SCCH part 1 detection can be implemented more efficiently using a ML-like correlation search. The structure of the UE's hardware used by this invention can be similar to the structure described in Publication No. 2005/0078648, and it is believed that from a complexity point of view, the gain over full decoding can be even larger. It will be noted, however, that the context of applying ML detection described above (e.g., saving processing load) is different from the context described in Publication No. 2005/0078648 (arriving at a decision sooner). In addition, the uses of the thresholds in this application and the Publication differ as E-AGCH decoded sequences, for example, contain CRCs but HS-SCCH part 1 messages do not.

Those of ordinary skill in this art will understand that the above-described threshold values are examples and that other values could be used. It will also be appreciated that procedures described above are carried out repetitively as necessary. To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method in a user equipment (UE) of detecting predetermined sequences in sequences received by the UE, comprising the steps of:
    conducting, in the UE, a hypothesis test on a received sequence;
    determining, in the UE, based on a result of the hypothesis test whether to decode the received sequence;
    if it is determined to decode the received sequence, decoding the received sequence; and
    determining whether the received sequence is a predetermined sequence based on at least one of the result of the hypothesis test and a decoded received sequence.

2. The method of claim 1, wherein determining whether to decode the received sequence includes:
    determining with a first confidence level from a result of the hypothesis test whether the received sequence is a predetermined sequence;
    if it is not determined with the first confidence level that the received sequence is a predetermined sequence, determining with a second confidence level from the result of the hypothesis test whether the received sequence is not a predetermined sequence; and
    if it is not determined with the second confidence level that the received sequence is not a predetermined sequence, decoding the received sequence and determining whether the received sequence is a predetermined sequence based on the decoded received sequence.

3. The method of claim 1, wherein determining whether to decode the received sequence includes:
    determining with a first confidence level from a result of the hypothesis test whether the received sequence is not a predetermined sequence;
    if it is not determined with the first confidence level that the received sequence is not a predetermined sequence, determining with a second confidence level from the result of the hypothesis test whether the received sequence is a predetermined sequence; and
    if it is not determined with the second confidence level that the received sequence is a predetermined sequence, decoding the received sequence and determining whether the received sequence is a predetermined sequence based on the decoded received sequence.

4. The method of claim 1, wherein determining whether to decode the received sequence includes:
    determining with a first confidence level from a result of the hypothesis test whether it cannot be decided whether the received sequence is or is not a predetermined sequence;
    if it is determined with the first confidence level that it cannot be decided whether the received sequence is or is not a predetermined sequence, decoding the received sequence and determining from the decoded received sequence whether the received sequence is a predetermined sequence;
    if it is not determined with the first confidence level that it cannot be decided whether the received sequence is or is not a predetermined sequence, determining with a second confidence level from the result of the hypothesis test whether the received sequence is a predetermined sequence.

5. The method of claim 1, wherein determining whether to decode the received sequence includes:
    determining with a first confidence level from a result of the hypothesis test whether it cannot be decided whether the received sequence is or is not a predetermined sequence;
    if it is determined with the first confidence level that it cannot be decided whether the received sequence is or is not a predetermined sequence, decoding the received sequence and determining from the decoded received sequence whether the received sequence is a predetermined sequence;
    if it is not determined with the first confidence level that it cannot be decided whether the received sequence is or is not a predetermined sequence, determining with a second confidence level from the result of the hypothesis test whether the received sequence is not a predetermined sequence.

6. The method of claim 1, wherein the hypothesis test comprises maximum likelihood detection.

7. The method of claim 1, wherein determining whether the received sequence is a predetermined sequence based on the decoded received sequence includes checking error detection information of the decoded received sequence.

8. The method of claim 7, wherein the error detection information includes a cyclic redundancy check.

9. The method of claim 1, further comprising the steps of, if the received sequence is a predetermined sequence, determining whether the received sequence is directed to the UE and acting according to the received sequence.

10. The method of claim 1, wherein the decoding step comprises Viterbi decoding.

11. An apparatus in a user equipment (UE) for detecting predetermined sequences in sequences received by the UE, comprising:
   a hypothesis tester adapted to conduct a hypothesis test on a received sequence and to determine, based on a result of the hypothesis test, whether the received sequence is a predetermined sequence;
   a decoder, responsive to the hypothesis tester, adapted to decode the received sequence; and
   a tester, responsive to the hypothesis tester, adapted to determine whether the received sequence is a predetermined sequence;
   wherein whether the received sequence is decoded is based on the result of the hypothesis test.

12. The apparatus of claim 11, wherein the tester determines whether the received sequence is a predetermined sequence based on error detection information of the received decoded sequence.

13. The apparatus of claim 12, wherein the error detection information includes a cyclic redundancy check.

14. The apparatus of claim 11, further comprising a processor adapted to implement predetermined sequences.

15. The apparatus of claim 11, further comprising a rate de-matcher, responsive to the hypothesis tester, adapted to generate a rate de-matched sequence from the received sequence, wherein the decoder is adapted to decode the rate de-matched sequence.

16. The apparatus of claim 11, wherein the hypothesis tester comprises at least one of a programmed electronic processor and logic configured to implement hypothesis testing.

17. The apparatus of claim 11, wherein the hypothesis tester comprises a maximum likelihood detector.

18. The apparatus of claim 11, wherein the decoder comprises a Viterbi decoder.

19. The apparatus of claim 11, wherein the hypothesis tester is adapted to determine whether the received sequence is decoded by:
   determining with a first confidence level from a result of the hypothesis test whether the received sequence is a predetermined sequence; and
   if it is not determined with the first confidence level that the received sequence is a predetermined sequence, determining with a second confidence level from the result of the hypothesis test whether the received sequence is not a predetermined sequence; and
   if it is not determined with the second confidence level that the received sequence is not a predetermined sequence, the decoder is adapted to decode the received sequence and the tester is adapted to determine whether the received sequence is a predetermined sequence based on the decoded received sequence.

20. The apparatus of claim 11, wherein the hypothesis tester is adapted to determine whether the received sequence is decoded by:
   determining with a first confidence level from a result of the hypothesis test whether the received sequence is not a predetermined sequence; and
   if it is not determined with the first confidence level that the received sequence is not a predetermined sequence, determining with a second confidence level from the result of the hypothesis test whether the received sequence is a predetermined sequence; and
   if it is not determined with the second confidence level that the received sequence is a predetermined sequence, the decoder is adapted to decode the received sequence and the tester is adapted to determine whether the received sequence is a predetermined sequence based on the decoded received sequence.

21. The apparatus of claim 11, wherein the hypothesis tester is adapted to determine whether the received sequence is decoded by:
   determining with a first confidence level from a result of the hypothesis test whether it cannot be decided whether the received sequence is or is not a predetermined sequence; and
   if it is not determined with the first confidence level that it cannot be decided whether the received sequence is or is not a predetermined sequence, determining with a second confidence level from the result of the hypothesis test whether the received sequence is a predetermined sequence; and
   if it is determined with the first confidence level that it cannot be decided that the received sequence either is or is not a predetermined sequence, the decoder is adapted to decode the received sequence and the tester is adapted to determine from the decoded received sequence whether the received sequence is a predetermined sequence.

22. The apparatus of claim 11, wherein the hypothesis tester is adapted to determine whether the received sequence is decoded by:
   determining with a first confidence level from a result of the hypothesis test whether it cannot be decided whether the received sequence is or is not a predetermined sequence; and
   if it is not determined with the first confidence level that it cannot be decided whether the received sequence is or is not a predetermined sequence, determining with a second confidence level from the result of the hypothesis test whether the received sequence is not a predetermined sequence; and
   if it is determined with the first confidence level that it cannot be decided whether the received sequence is or is not a predetermined sequence, the decoder is adapted to decode the received sequence and the tester is adapted to determine from the decoded received sequence whether the received sequence is not a predetermined sequence.

* * * * *